M. B. MARTIN.
BRASS WIND INSTRUMENT.
APPLICATION FILED APR. 6, 1915.
1,158,384.
Patented Oct. 26, 1915.
2 SHEETS—SHEET 1.
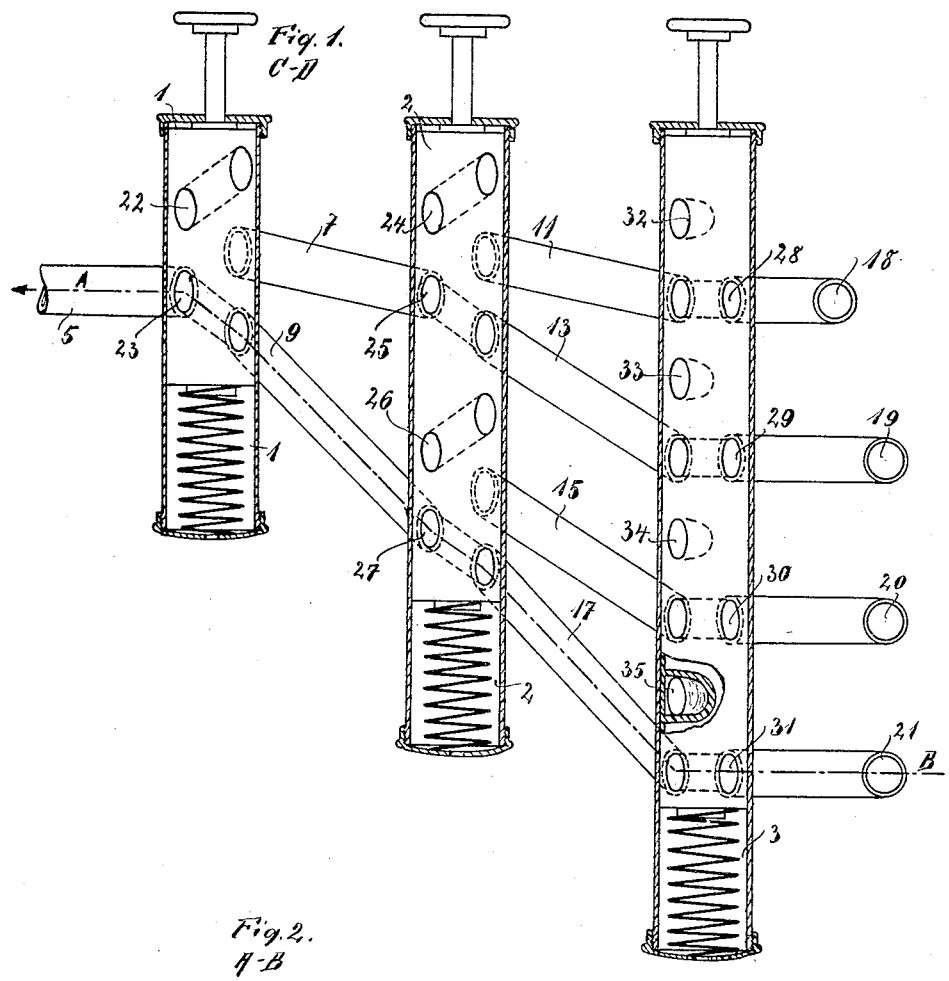
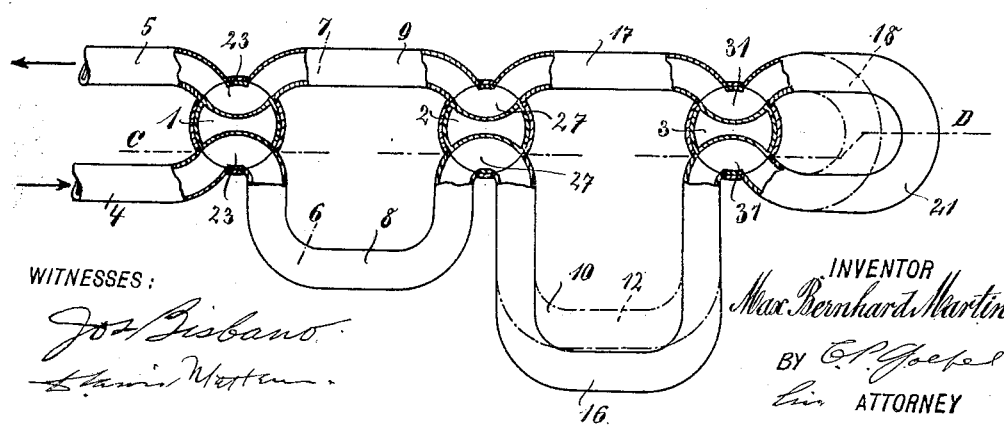
WITNESSES:
INVENTOR
Max Bernhard Martin
BY
ATTORNEY

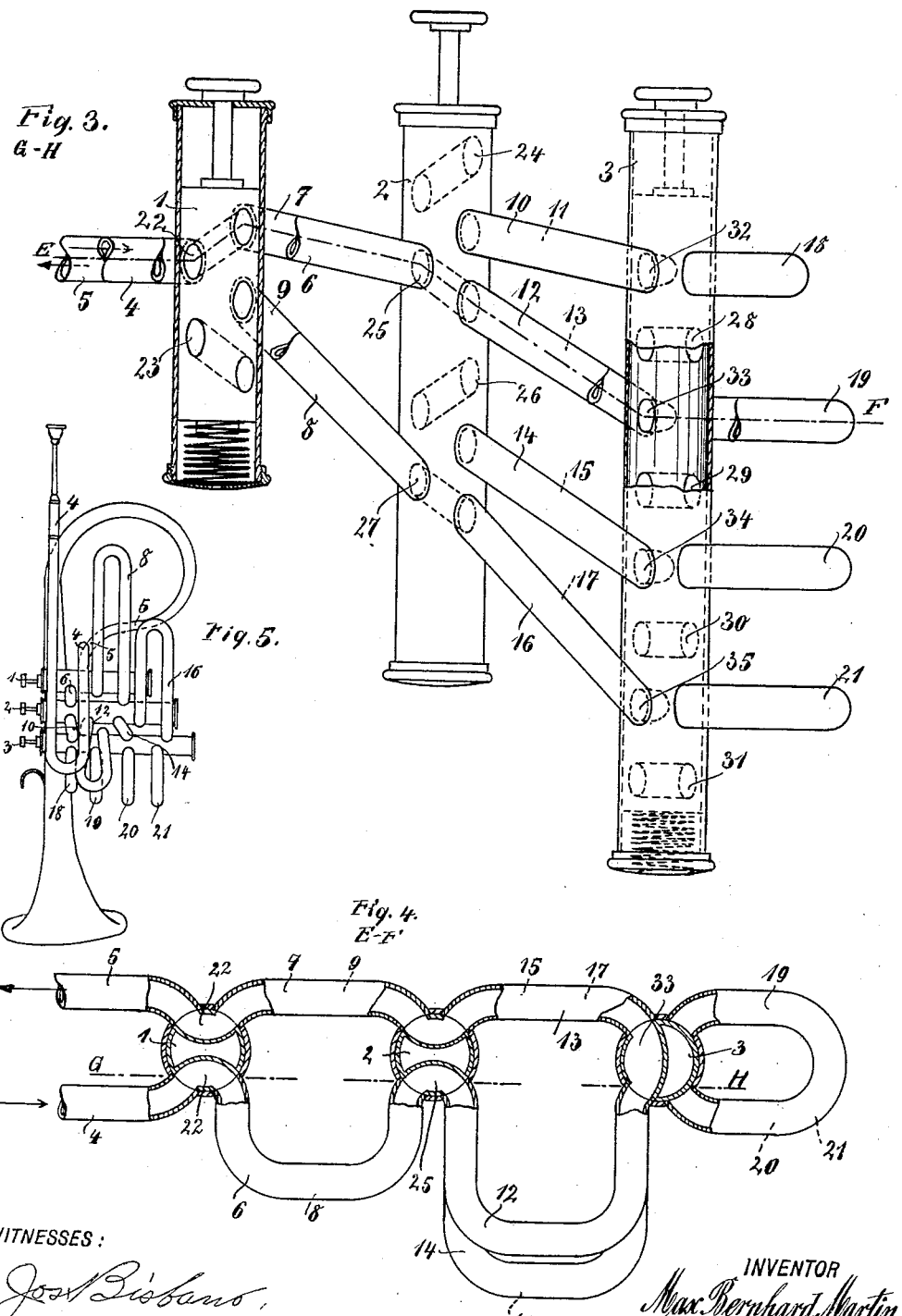

UNITED STATES PATENT OFFICE.

MAX BERNHARDT MARTIN, OF MARKNEUKIRCHEN, GERMANY.

BRASS WIND INSTRUMENT.

1,158,384. Specification of Letters Patent. Patented Oct. 26, 1915.

Application filed April 6, 1915. Serial No. 19,520.

*To all whom it may concern:*

Be it known that I, MAX BERNHARDT MARTIN, a subject of the German Emperor, and resident of Markneukirchen, in the German Empire, have invented a new and Improved Brass Wind Instrument, of which the following is a specification.

This invention relates to a brass wind instrument for producing by a simple arrangement and combination of parts in proper pitch and purity the tones lying between the natural tones of the scale.

Figure 1 is a longitudinal section through the valves employed in my improved instrument, the section being taken in line C—D of Fig. 2 and the valves being shown in their position of rest. Fig. 2 is a plan partly in section on line A—B of Fig. 1, showing some of the tubes, the valves being in section and in open tone position. Fig. 3 is a representation similar to Fig. 1, the left-hand valve being shown completely in section and the right hand valve being shown partly in section and the pistons of these two valves being depressed, the position corresponding to line G—H of Fig. 4. Fig. 4 is a plan partly in section on line E—F of Fig. 3, showing some of the tubes, the valves being in section. Fig. 5 is a side view of a brass wind instrument constructed according to my invention.

1, 2, and 3 are the three valves of which the first is connected by the pipe 4 with the mouth piece and by the pipe 5 with the bell of the instrument. The valves 1 and 2 are connected by pairs of pipes 6—7 and 8—9 and the valves 2 and 3 are connected by pipes 10—11, 12—13, 14—15, and 16—17, and there are furthermore bent pipes 18, 19, 20, and 21, which belong solely to the valve 3.

The piston of the valve 1 has pairs of oblique channels 22 and 23 for connecting the pipes 4 and 5 either with the pipes 6 and 7 or with the pipes 8 and 9. The piston of the valve 2 has pairs of oblique channels 24, 25, 26, and 27, for connecting the pipes 6 and 7 either with the pipes 10 and 11 or with the pipes 12 and 3, and for connecting the pipes 8 and 9 either with the pipes 14 and 15 or with the pipes 16 and 17. The piston of the valve 3 has pairs of horizontal passages 28, 29, 30, and 31, for connecting the pairs of pipes 10—11, 12—13, 14—15, and 16—17, respectively, with the bent pipes 18, 19, 20, and 21, respectively, and there are, furthermore, horizontal single channels 32, 33, 34, and 35, for connecting with each other the pipes forming one pair.

In the position shown in Figs. 1 and 2 the pipes 4 and 5 are connected by means of the piston channels 23 and 23 with the pair of pipes 8 and 9; and the pipes 8 and 9 are connected by means of the piston channels 27 and 27 with the pair of pipes 16 and 17; and the pipes 16 and 17 are connected by the piston channels 31 and 31 with the return pipe 21. In the position shown in Figs. 3 and 4 the valves 1 and 3 are depressed and the pipes 4 and 5 are connected by means of the piston channels 22 and 22 with the pair of pipes 6 and 7, and these pipes 6 and 7 are connected by the piston channels 25 and 25 with the pair of pipes 12 and 13, and the pipes 12 and 13 are connected with each other by the piston channel 33. Eight tones may be produced by this device according to the different positions of the pistons; namely a tone due to the normal position of all the pistons, a tone due to the depression only of the piston 1, a tone due to the depression only of the piston 2, a tone due to the depression only of the piston 3, a tone due to the depression of the pistons 1 and 2, a tone due to the depression of the pistons 1 and 3, a tone due to the depression of the pistons 2 and 3, and a tone due to the depression of all the pistons 1, 2 and 3 together.

The relations of the combined lengths which are necessary for the production of a tone of proper pitch is shown in the following table to wit:

| Note. | Valve. | Length of tube. |
|---|---|---|
| $f$ | 0 | 1,963m. |
| $f$ sharp | 3 | 1,853m. |
| $g$ | 2 | 1,749m. |
| $g$ sharp | 2,3 | 1,651m. |
| $a$ | 1 | 1,558m. |
| $b$ flat | 1,3 | 1,470m. |
| $b$ natural | 1,2 | 1,388m. |
| $c$ | 1,2,3 | 1,310m. |

Having now described my invention what I desire to secure by a patent of the United States is:

1. A brass wind instrument, comprising a plurality of valve-casings of different lengths, pistons therein, a plurality of oblique channels in each of said pistons; a plurality of pairs of pipes connecting said casings with each other, pipes connecting the first casing with the mouth piece and the bell, and return pipes commencing at the last casing and terminating also at the same, said channels being adapted to connect the mouth piece, return pipe and the bell pipe of the first casing with any one of the return pipes of the last casing, in conformity with the positions of the pistons.

2. A brass wind instrument comprising three valve casings, pistons therein, two pairs of channels in the piston of the first casing, four pairs of channels in the piston of the second casing, and four pairs and four single channels in the piston of the third casing; two pipes connecting the first casing with the mouth piece and the bell, two pairs of pipes connecting the first and the second casing, four pairs of pipes connecting the second and the third casing, and four bent return pipes commencing and terminating at the third casing, said pistons and channels being adapted to connect the mouth piece pipe and the bell pipe of the first casing with any one of the return pipes of the last casing, in conformity with the positions of the pistons.

3. A brass wind instrument comprising three valve casings, pistons therein, two pairs of oblique channels in the piston of the first casing, four pairs of oblique channels in the piston of the second casing, four pairs of horizontal channels, four single horizontal channels, in the pistons of the third casing, two pipes connecting the first casing with the mouth piece and the bell, two pairs of pipes, connecting the first and the second casing, four pairs of pipes connecting the second and third casing, and four bent return pipes commencing and terminating at the third casing, said pistons and channels being adapted to connect the mouth piece pipe and the bell pipe of the first casing with any one of the return pipes of the last casing, in conformity with the positions of the pistons.

In testimony, that I claim the foregoing as my invention, I have signed my name in presence of two subscribing witnesses.

MAX BERNHARDT MARTIN.

Witnesses:
RANDOLPH A. FRICKE,
F. HOGG.

Copies of this patent may be obtained for five cents each, by addressing the "Commissioner of Patents, Washington, D. C."